United States Patent
Ichihara et al.

(10) Patent No.: US 10,128,524 B2
(45) Date of Patent: Nov. 13, 2018

(54) FUEL CELL MANUFACTURING METHOD AND FUEL CELL MANUFACTURING DEVICE

(71) Applicant: Nissan Motor Co., Ltd., Yokohama-shi, Kanagawa (JP)

(72) Inventors: Keiji Ichihara, Kanagawa (JP); Naoyuki Torii, Kanagawa (JP); Tsuneo Saito, Kanagawa (JP); Takahiko Fujii, Kanagawa (JP); Teruhito Nakatomi, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 70 days.

(21) Appl. No.: 15/308,390

(22) PCT Filed: May 20, 2015

(86) PCT No.: PCT/JP2015/064536
§ 371 (c)(1),
(2) Date: Nov. 2, 2016

(87) PCT Pub. No.: WO2015/178432
PCT Pub. Date: Nov. 26, 2015

(65) Prior Publication Data
US 2017/0069928 A1  Mar. 9, 2017

(30) Foreign Application Priority Data
May 21, 2014 (WO) ............... PCT/JP2014/063503

(51) Int. Cl.
*H01M 8/241* (2016.01)
*H01M 8/0286* (2016.01)
(Continued)

(52) U.S. Cl.
CPC ............ *H01M 8/241* (2013.01); *B32B 7/14* (2013.01); *B32B 37/0076* (2013.01);
(Continued)

(58) Field of Classification Search
CPC .. H01M 8/241; H01M 8/1004; H01M 8/0286; H05B 6/10; H05B 6/365;
(Continued)

(56) References Cited

U.S. PATENT DOCUMENTS 4,054,770 A * 10/1977 Jackson ............... C21D 9/60
219/645
4,467,162 A * 8/1984 Kondo ............... H05B 6/1209
219/622
(Continued)

FOREIGN PATENT DOCUMENTS

CN  1326309 A  12/2001
JP  2005-190915 A  7/2005
(Continued)

OTHER PUBLICATIONS

JP 2013-187036A Machine Translation of Description (EPO/Google).*
JP 2006-302741A Machine Translation of Description (EPO/Google).*

*Primary Examiner* — Michael N Orlando
*Assistant Examiner* — Cynthia L Schaller
(74) *Attorney, Agent, or Firm* — Global IP Counselors, LLP (57) ABSTRACT

A fuel cell manufacturing method and a fuel cell manufacturing device are provided in which it is possible to heat, in a localized manner, sections for which heating is desired. In this fuel cell manufacturing method, a laminate is obtained by stacking a membrane electrode assembly and a separator that has an adhesive disposed therebetween. Coils are provided adjacent a site of the laminate to be heated. Preferably, (Continued)

coils are disposed on opposite sides of the site in the stacking direction of the membrane electrode assembly and the separator such that current flows in the same direction as directions intersecting the stacking direction. The site to be heated is subjected to induction heating by passing current through the coils.

14 Claims, 11 Drawing Sheets

(51) Int. Cl.
- *H05B 6/36* (2006.01)
- *B32B 7/14* (2006.01)
- *B32B 37/00* (2006.01)
- *B32B 37/06* (2006.01)
- *B32B 37/12* (2006.01)
- *H01M 8/1004* (2016.01)
- *H05B 6/10* (2006.01)

(52) U.S. Cl.
CPC ........ *B32B 37/065* (2013.01); *B32B 37/1207* (2013.01); *B32B 37/1292* (2013.01); *H01M 8/0286* (2013.01); *H01M 8/1004* (2013.01); *H05B 6/10* (2013.01); *H05B 6/365* (2013.01); *B32B 2037/1253* (2013.01); *B32B 2250/03* (2013.01); *B32B 2305/72* (2013.01); *B32B 2307/202* (2013.01); *B32B 2307/206* (2013.01); *B32B 2309/022* (2013.01); *B32B 2457/18* (2013.01); *Y02P 70/56* (2015.11)

(58) Field of Classification Search
CPC .............. B32B 37/0076; B32B 37/065; B32B 37/1207; B32B 37/1292; B32B 7/14; B32B 2307/202; B32B 2307/206; B32B 2309/022; B32B 2457/18; B32B 2037/1253; B32B 2250/03; B32B 2305/72; Y02P 70/56
See application file for complete search history.

(56) References Cited

U.S. PATENT DOCUMENTS

| | | |
|---|---|---|
| 4,561,489 A | 12/1985 | Dantzig et al. |
| 2002/0011486 A1 | 1/2002 | Anderhuber et al. |
| 2005/0061804 A1 | 3/2005 | Golm |
| 2015/0090707 A1* | 4/2015 | Uchida ............. H01L 21/67109 219/634 |

FOREIGN PATENT DOCUMENTS

| | | | |
|---|---|---|---|
| JP | 2006-134644 A | | 5/2006 |
| JP | 2006-302741 A | * | 11/2006 |
| JP | 2006-302741 A | | 11/2006 |
| JP | 2013-187036 A | * | 9/2013 |

* cited by examiner

FUEL CELL MANUFACTURING METHOD AND FUEL CELL MANUFACTURING DEVICE

This application is a U.S. National stage application of International Application No. PCT/JP2015/064536, filed May 20, 2015, which claims priority to International Application No. PCT/JP2014/063503 filed on May 21, 2014, the contents of which are hereby incorporated herein by reference.

BACKGROUND

Field of the Invention

The present invention relates to a manufacturing method of a fuel cell and a manufacturing device of a fuel cell.

Background Information

A technique to cure an adhesive that is disposed between members that configure a fuel cell by induction heating is known. For example, in the invention disclosed in Japanese Laid Open Patent Application No. 2006-302741 (Patent Document 1), a laminate obtained by stacking a multiplicity of membrane electrode assemblies (MEA) and separators is subjected to induction heating to cure an adhesive disposed on the outer perimeter part thereof.

Since a member is directly heated by induction heating, the heating time can be shortened compared to indirect heating using a hot-blast stove, or the like.

SUMMARY

However, depending on the arrangement of the coils disclosed in Patent Document 1, not only are the portions heated where adhesive is applied, which do require heating, but those portions which do not require heating, such as a power generation reaction portion surrounded by an adhesive that is disposed on the outer perimeter part of the separator or the membrane electrode assembly, are also heated.

An electrolyte membrane and catalyst layers disposed on both sides thereof, etc., are positioned in the power generation reaction portion, where electrochemical reactions proceed. If this location is heated to a high temperature, there is the risk that the power generation performance of the fuel cell deteriorates, which is undesirable.

In order to solve such problems, an object of the present invention is to provide a fuel cell manufacturing method and a fuel cell manufacturing device with which it is possible to heat, in a localized manner, portions for which heating is desired.

In order to solve such problems, an object of the present invention is to provide a fuel cell manufacturing method and a fuel cell manufacturing device with which it is possible to heat, in a localized manner, portions for which heating is desired.

According to the fuel cell manufacturing method of the present invention, a site to be heated of a laminate obtained by stacking a membrane electrode assembly and a separator has an adhesive disposed thereon, and coils are disposed on both sides of the site in the stacking direction of the membrane electrode assembly and the separator such that current flows in the same direction as directions intersecting the stacking direction. In the fuel cell manufacturing method of the present invention, electric current is passed through these coils to subject the site to be heated to induction heating.

The fuel cell manufacturing device of the present invention comprises coils that are disposed on both sides of a site to be heated of a laminate, obtained by stacking a membrane electrode assembly with an adhesive disposed thereon, in the stacking direction of the membrane electrode assembly and the separator such that current flows in the same direction as directions intersecting the stacking direction. The fuel cell manufacturing device of the present invention comprises a power source that is electrically connected to these coils.

In the present invention, since induction current is selectively generated in a site to be heated by causing electric current to flow through coils, which are disposed on both sides of the site to be heated in the stacking direction, in the same direction as directions intersecting the stacking direction, it is possible to heat the site to be heated in a localized manner.

BRIEF DESCRIPTION OF THE DRAWINGS

Referring now to the attached drawings which form a part of this original disclosure.

DETAILED DESCRIPTION OF THE EMBODIMENTS

Embodiments of the present invention will be described below, with reference to the drawings. The dimensional ratios in the drawings are exaggerated for the sake of convenience of the explanation, and are different from the actual ratios.

Figure 1:
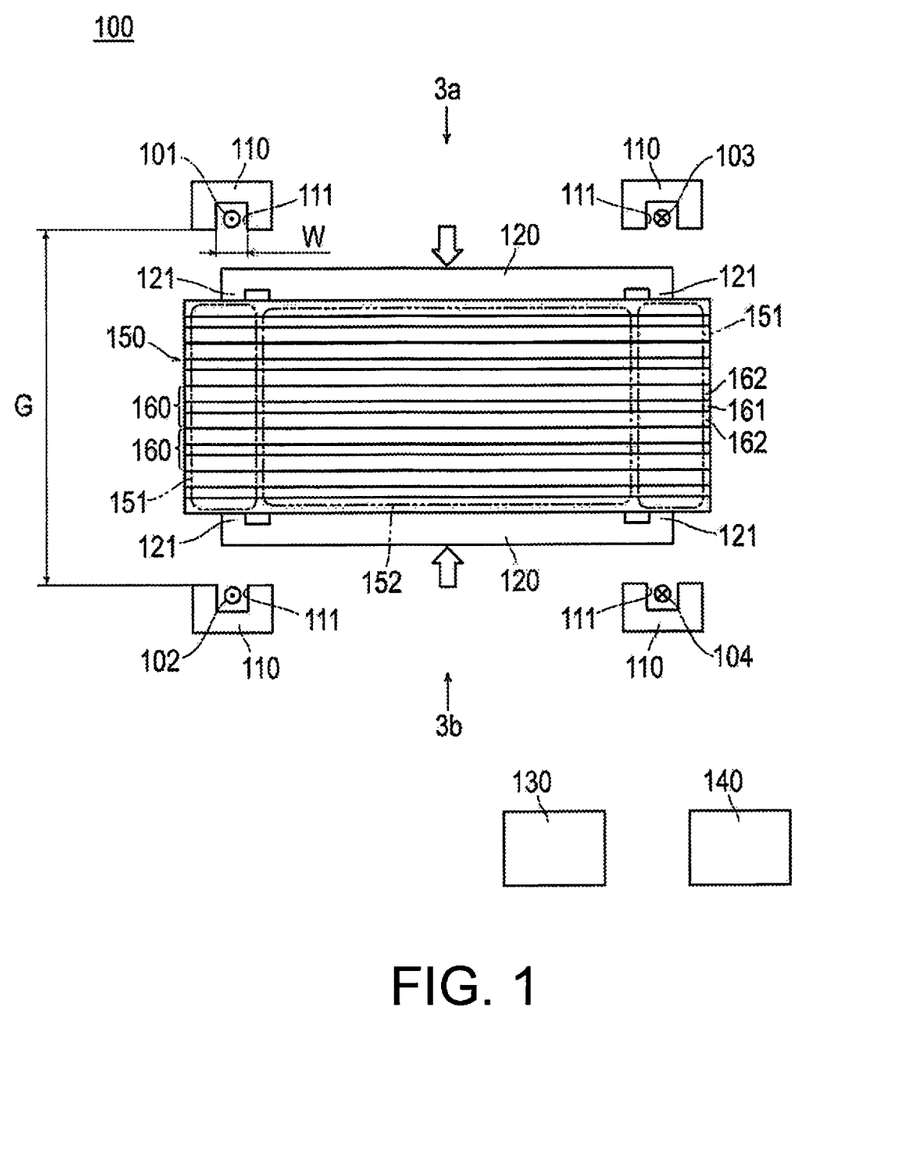
FIG. 1 is a schematic view schematically illustrating an overview of a fuel cell manufacturing device of the present embodiment.

The fuel cell manufacturing device 100 of the present embodiment comprises coils 101, 102, 103, 104, a plurality of magnetic path forming members 110, a pair of shielding members 120 (pressing fixture), a power source 130 and a control device 140, as illustrated in FIG. 1.

The coils 101, 102 are disposed on both sides of one of a pair of sites 151 to be heated of the fuel-cell module 150 (laminate) in the stacking direction of a membrane electrode assembly 161 and a pair of separators 162. The coils 101, 102 extend in the same direction as the direction that is perpendicular to the stacking direction of the membrane electrode assembly 161 and the separators 162 (the direction perpendicular to the figure in FIG. 1).

The coils 103, 104 are also disposed on both sides of one of the sites 151 to be heated in the stacking direction. The coils 103, 104 extend in the same direction as the direction that is perpendicular to the stacking direction (the direction perpendicular to the plane in FIG. 1).

One of the magnetic path forming members 110 surrounds each of the coils 101, 102, 103, 104. An opening 111 is formed in each of the magnetic path forming members 110. The openings 111 face the sites 151 to be heated. The magnetic path forming members 110 are formed from a ferromagnetic material such as ferrite, magnetic steel sheets, and permalloy.

The shielding members 120 are disposed in a site 152 in the fuel-cell module 150 that does not require heating (hereinafter referred to as heating-unnecessary site 152). The shielding members 120 are formed from a ferromagnetic material. Examples of ferromagnetic materials include ferrite, magnetic steel sheets, and permalloy.

An end 121 of each of the shielding members 120 is disposed in the sites 151 to be heated. The ends 121 are oriented in the stacking direction.

The shielding members 120 pressurize the fuel-cell module 150 in the stacking direction. The shielding members 120 are provided with a pressing force by, for example, an elastic member, such as a spring, so as to pressurize the fuel-cell module 150. The pressing force can be provided to the shielding members 120 by fastening the shielding members 120 to each other at the top and bottom.

The power source 130 is electrically connected to the coils 101, 102, 103, 104. The power source 130 passes high-frequency current through the coils 101, 102, 103, 104. The power source 130 comprises a frequency regulator that controls the frequency of alternating current, and a transformer to increase or decrease the voltage.

The control device 140 is electrically connected to the power source 130. The control device 140 sends and receives signals to and from the power source 130. The control device 140 controls the operation of the power source 130, and controls the electric current that flows through the coils 101, 102, 103, 104. The control device 140 is, for example, a computer such as a personal computer or an engineering workstation.

The fuel-cell module 150 has a configuration obtained by stacking fuel cells 160. The fuel cell 160 has a configuration in which a membrane electrode assembly 161 is sandwiched by a pair of separators 162. The fuel cell 160 constitutes the minimum unit of a fuel-cell stack.

Figure 2:
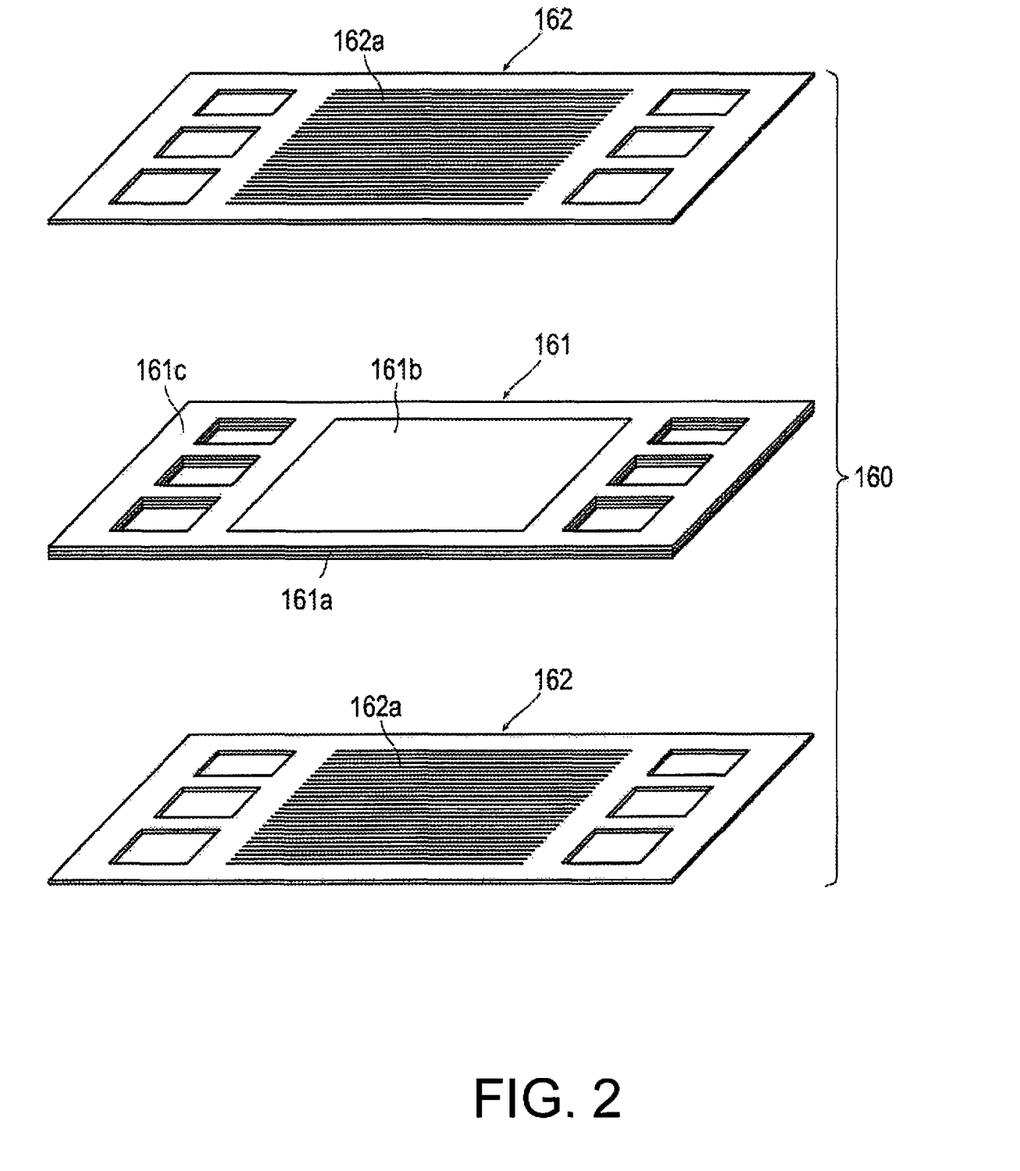
FIG. 2 is an exploded perspective view illustrating the fuel cells that configure a laminate.

The membrane electrode assembly 161 comprises an electrolyte membrane 161a, an electrode 161b formed on both surfaces of the electrolyte membrane 161a, and a frame 161c that is provided around the electrode 161b on both surfaces of the electrolyte membrane 161a, as is illustrated in FIG. 2. The electrolyte membrane 161a is a proton conductive ion-exchange membrane formed from a solid polymer material such as fluorine-based resin, and exhibits good electrical conductivity in a wet state. The electrode 161b has a configuration in which a gas diffusion layer is formed on a catalyst layer. The catalyst layer of the electrode 161b formed on one surface of the electrolyte membrane 161a comprises a catalyst component having a catalytic effect in the reductive reaction of oxygen. The catalyst layer of the electrode 161b formed on the other surface of the electrolyte membrane 161a comprises a catalyst component having a catalytic effect in the oxidative reaction of hydrogen. The gas diffusion layer that is provided on the catalyst layer has conductivity and gas diffusibility. The gas diffusion layer is formed from, for example, a wire mesh. The frame 161c is formed from, for example, resin.

The separators 162 are formed from a conductive material. An example of a conductive material is stainless steel (SUS). Other examples of conductive materials include iron, titanium, iron or titanium that contains carbon, and a material consisting of carbon and resin.

A flow channel 162a is formed on both sides of each of the separators 162. Fuel gas, oxidant gas, or a cooling fluid flows through the flow channels 162a.

The electrode 161b, the electrolyte membrane 161a between the electrodes 161b, and the flow channels 162a are positioned in the heating-unnecessary site 152. The heating-unnecessary site 152 is a power generation reaction portion in which electrochemical reactions proceed. The outer perimeter part of the membrane electrode assembly 161 (more specifically, the portion around the electrode 161b), and the outer perimeter part of the separators 162 (more specifically, the portion around the flow channels 162a) correspond to the sites 151 to be heated.

Figure 3:
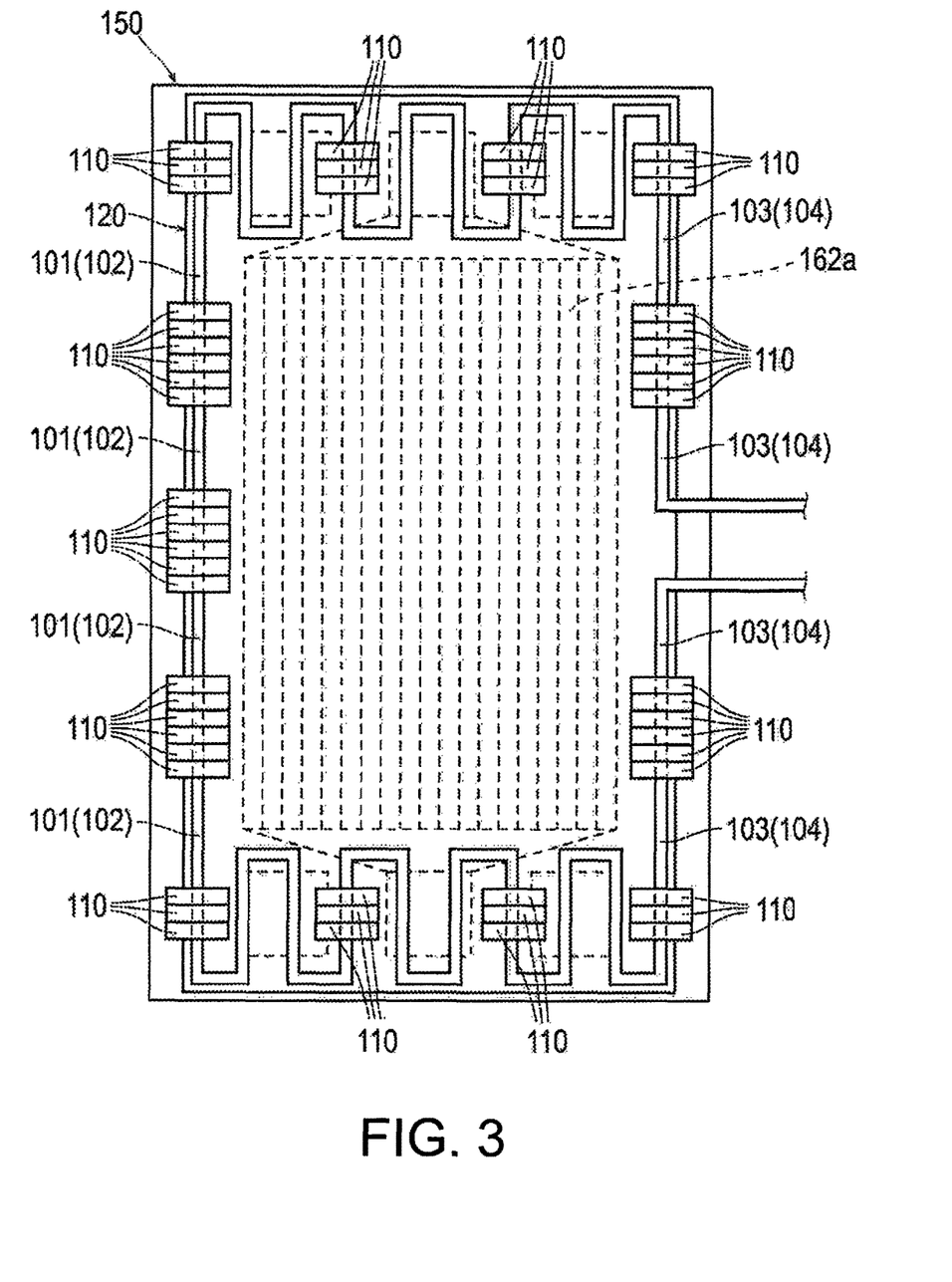
FIG. 3 is a view of the fuel cell manufacturing device of the present embodiment as viewed from reference numeral 3a or 3b in FIG. 1.

The coils 101, 102, 103, 104 are disposed on the outer perimeter part of the fuel-cell module 150, which corresponds to the sites 151 to be heated, as is illustrated in FIG. 3. The coils 101, 103 are formed from the same wire material. The coils 102, 104 are formed from the same wire material.

The number of magnetic path forming members 110 differs depending on the disposed location. In the example illustrated in FIG. 3, there is a location in which six magnetic path forming members 110 are disposed and a location in which three magnetic path forming members 110 are disposed. The saturation magnetic flux density differs depending on the number of magnetic path forming members 110 that are disposed. The saturation magnetic flux density is high in a location where many magnetic path forming members 110 are disposed, and the saturation magnetic flux density is low in a location where the number of magnetic path forming members 110 is small. The number and the locations of the magnetic path forming members 110 to be disposed are not particularly limited.

The fuel cell manufacturing method will now be described.

Figure 4:
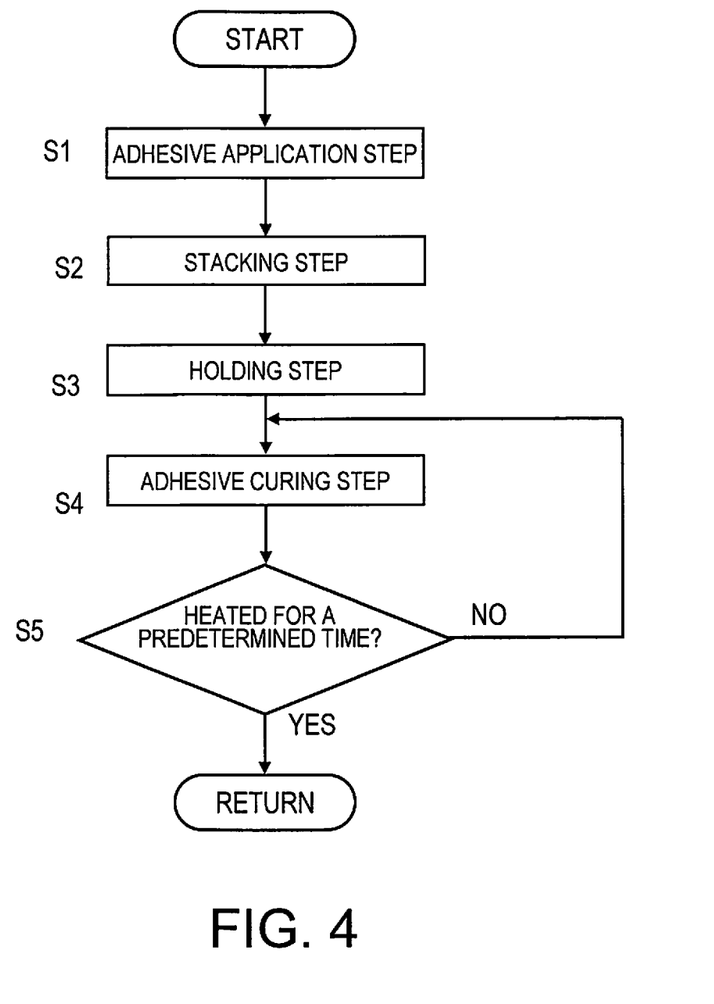
FIG. 4 is a flowchart illustrating the fuel cell manufacturing method of the present embodiment.

The fuel cell manufacturing method comprises an adhesive application Step S1 for applying adhesive to a workpiece, a stacking Step S2 for stacking workpieces, a holding Step S3 for holding the stacked workpieces, and an adhesive curing Step S4 for curing the adhesive, as illustrated in FIG. 4.

In the adhesive application Step S1, an adhesive is applied to the surface of the outer perimeter part of at least one of the membrane electrode assembly 161 and the separators 162, which are stacked and adjacent to each other. In addition, in the adhesive application Step S1, an adhesive is applied to the surface of the outer perimeter part of at least one of the separators 162 that are adjacent to each other between the fuel cell 160 and the fuel cell 160 when stacked.

The application of the adhesive may be carried out while a nozzle that discharges the adhesive is moved, or may be carried out by screen printing. An example of an adhesive is a thermosetting resin, such as an epoxy resin.

In the stacking Step S2, the separators 162 and the membrane electrode assembly 161 are stacked, and the fuel cell 160 as well as the fuel-cell module 150 are assembled. The assembled fuel-cell module 150 is disposed between the shielding members 120 (FIG. 1).

In the holding Step S3, the shielding members 120 pressurize and hold the fuel-cell module 150 in the stacking direction.

In the adhesive curing Step S4, electric current is passed through the coils 101, 102, 103, 104, and the sites 151 to be heated are subjected to induction heating.

Figure 5:
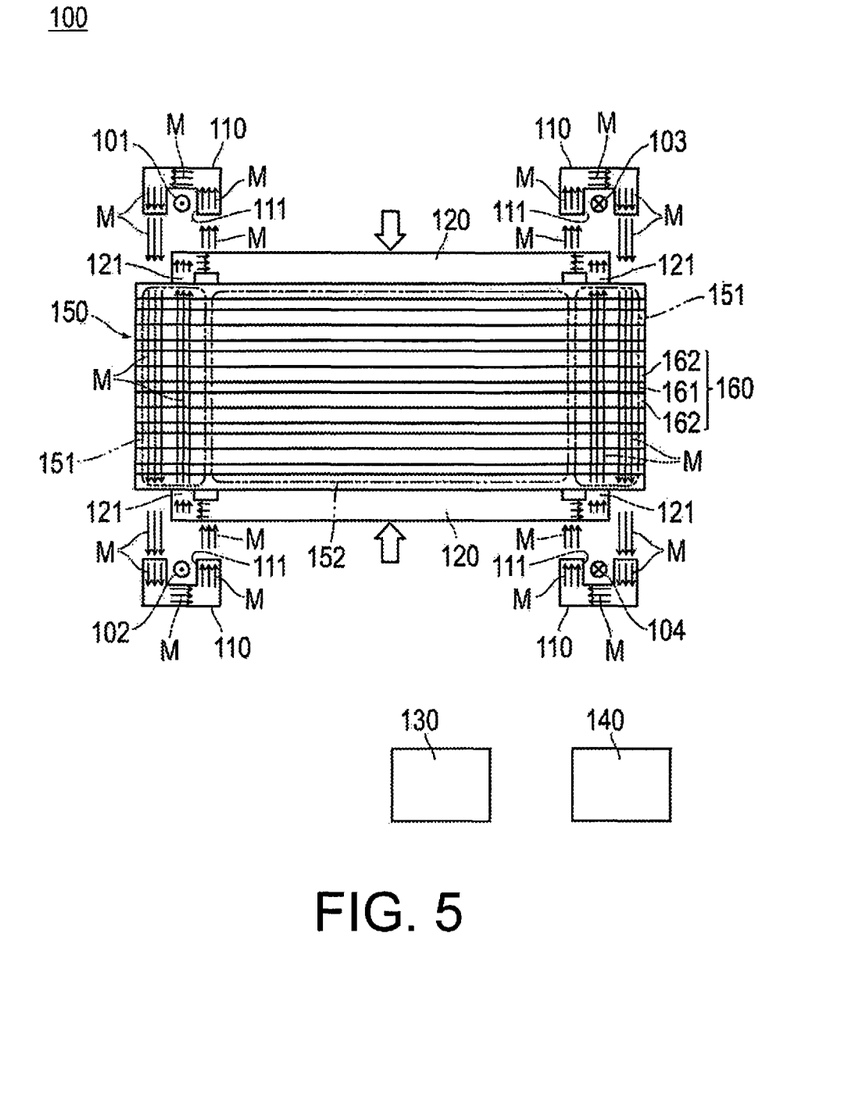
FIG. 5 is a schematic view schematically illustrating the magnetic flux when subjecting a laminate to induction heating by the fuel cell manufacturing device of the present embodiment.

When electric current flows through the coils 101, 102, 103, 104, magnetic flux M is generated, as illustrated in FIG. 5. In FIG. 5, electric current flows through the coils 101, 102 in a direction perpendicular to the plane of the drawing, from the back side to the front side of the drawing. In FIG. 5, electric current flows through the coils 103, 104 in a direction perpendicular to the plane of the drawing, from the front side to the back side of the drawing.

Magnetic flux M is formed in the sites 151 to be heated, so as to be substantially perpendicular to the surfaces of the separators 162. As a result, induction current is generated in a location of each of the separators 162 that corresponds to the sites 151 to be heated, and heat that corresponds to the induction current is generated. The adhesive is cured by this heat, bonding the stacked members to each other. The control device 140 stops the current that flows in the coils 101, 102, 103, 104 after a predetermined time has elapsed and ends the heating (S5 in FIG. 4).

The completed fuel-cell module 150 is tested for gas leaks, power generation performance, and the like. Thereafter, a fuel cell stack is formed by stacking and fastening a multiplicity of fuel-cell modules 150. The fuel cell stack is also tested for gas leaks, power generation performance, and the like.

The action and effects of the present embodiment will be described.

In the present embodiment, electric current is passed through the coils 101, 102 (coils 103, 104), which are disposed on both sides of the sites 151 to be heated in the stacking direction, in the same direction as directions intersecting the stacking direction. As a result, magnetic flux M is selectively generated in the sites 151 to be heated, in a direction that is substantially perpendicular to the surfaces of the separators 162, and induction current is selectively generated in the separators 162 in locations that correspond to the sites 151 to be heated. Therefore, it is possible to heat the sites 151 to be heated in a localized manner.

Since the shielding members 120 are disposed in the heating-unnecessary site 152, the magnetic flux density that penetrates the heating-unnecessary site 152 is reduced. As a result, the induction current is reduced, and the generation of heat at the heating-unnecessary site 152 is suppressed.

The ends 121 of the shielding members 120, which are formed from a ferromagnetic material, are located in the sites 151 to be heated, and are oriented in the stacking direction. The magnetic flux M is thereby induced at the sites 151 to be heated and easily converges. Accordingly, the magnetic flux density that is substantially perpendicular to the surfaces of the separators 162 is increased at the sites 151 to be heated, and, as a result, the induction current is increased, and the amount of generated heat at the sites 151 to be heated is increased. Therefore, it is possible to efficiently carry out localized induction heating of the sites 151 to be heated.

The magnetic path forming members 110 are disposed such that the openings 111 face the sites 151 to be heated. The magnetic flux M is thereby induced at the sites 151 to be heated and easily converges, and the magnetic flux density that is substantially perpendicular to the surfaces of the separators 162 is increased. As a result, the induction current is increased and the amount of generated heat at the sites 151 to be heated is increased; it is thereby possible to efficiently heat the sites 151 to be heated.

The number of the magnetic path forming members 110 differs depending on the disposed location (refer to FIG. 3), and, as a result, the saturation magnetic flux density changes depending on the location. Accordingly, it is possible to change the amount of generated heat depending on the location, and to carry out heating that is appropriate to that location. For example, a large number of magnetic path forming members 110 are disposed in a location for which heating to a relatively high temperature is desired in order to increase the amount of generated heat, and, conversely, the magnetic path forming members 110 are reduced in number, or not disposed at all, in a location where it is desired to suppress the temperature, in order to suppress the amount of generated heat.

In the fuel-cell module 150, the sites 151 to be heated is heated in a state of pressurization by the shielding members 120; therefore, the stacked members are attached to each other and bonded together. Therefore, the electrical conductivity between the members becomes excellent.

Since the shielding members 120 play the role of a pressing fixture that pressurizes the fuel-cell module 150, it is not necessary to separately provide pressing fixtures; therefore, the device can be simplified.

The present invention is not limited to the embodiment described above, and various modifications are possible within the scope of the claims.

For example, the fuel-cell module 150 is heated in the embodiment described above, but no limitation is thereby implied; one fuel cell 160 as a laminate may be heated.

Figure 6:
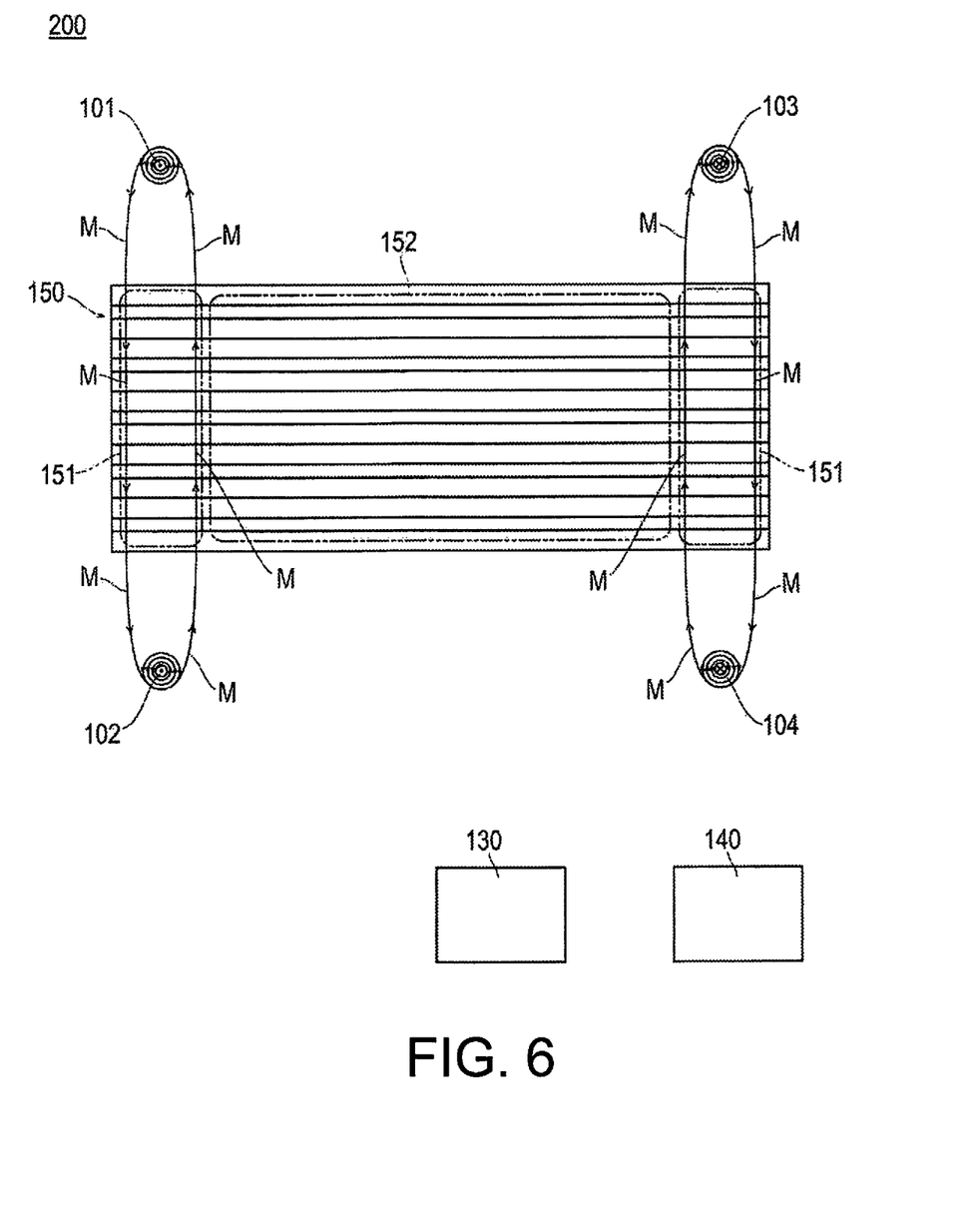
FIG. 6 is a schematic view schematically illustrating an overview of the fuel cell manufacturing device of a first modified example.

In addition, the present invention includes a fuel cell manufacturing device 200 in which the magnetic path forming members 110 and the shielding members 120 are omitted from the embodiment described above, as illustrated in FIG. 6. The other configurations of the fuel cell manufacturing device 200 are the same as the above-described embodiment, which are given the same codes as the fuel cell manufacturing device 100. The fuel cell manufacturing device 200 is also capable of heating the sites 151 to be heated in a localized manner by magnetic flux M that is generated by the coils 101, 102 (coils 103, 104).

In addition, the present invention includes an embodiment in which one of the magnetic path forming members 110 or the shielding members 120 of the above-described embodiment is added to the fuel cell manufacturing device 200. The shielding members are not limited to the shielding members 120 of the above-described embodiment.

The present invention includes a fuel cell manufacturing device 300 that has a pair of shielding members 320 that are different from the embodiment described above, as illustrated in FIG. 7. The other configurations of the fuel cell manufacturing device 300 are the same as the fuel cell manufacturing device 200.

Figure 7:
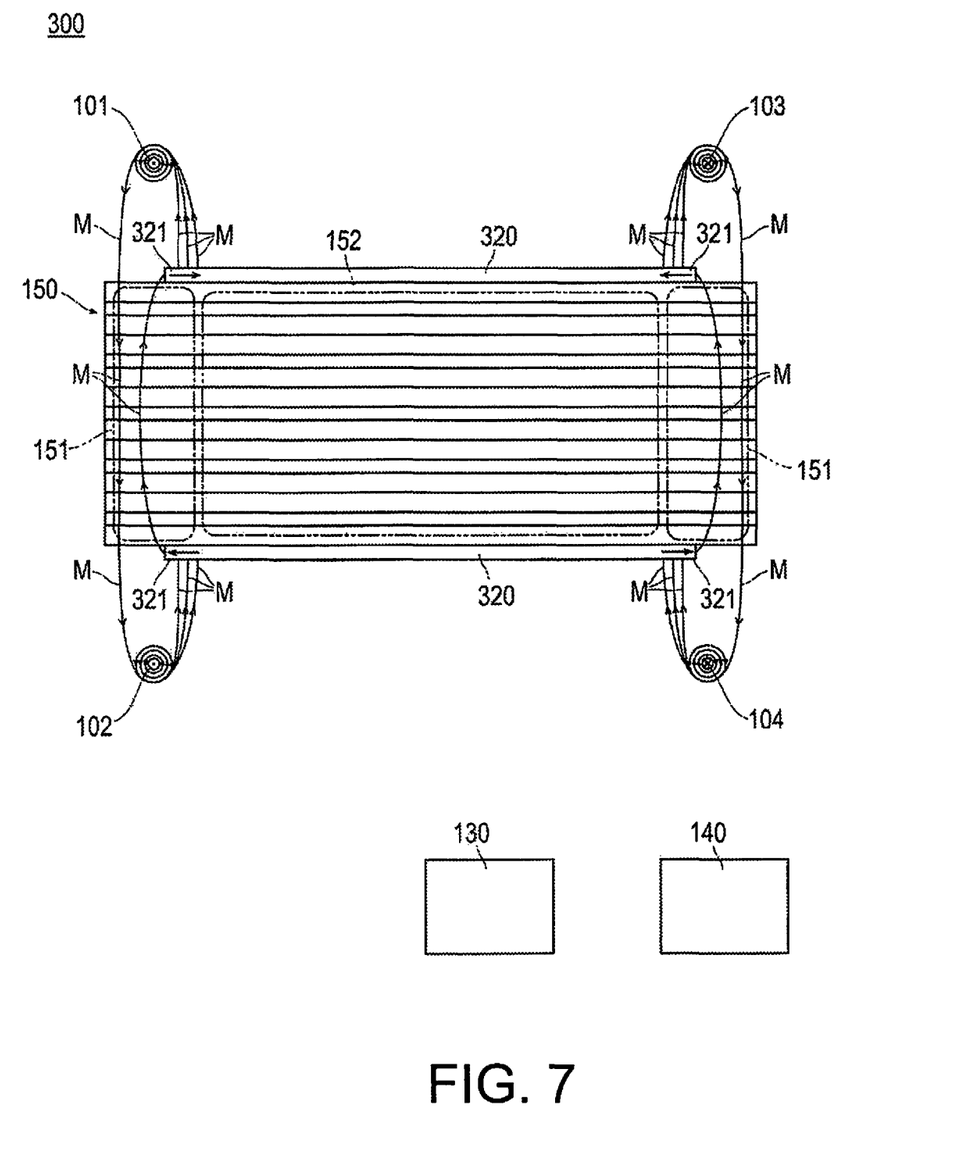
FIG. 7 is a schematic view schematically illustrating an overview of the fuel cell manufacturing device of a second modified example.

The ends 321 of the shielding members 320 are located in the sites 151 to be heated, but is not oriented in the stacking direction as is the case with the ends 121 of the shielding members 120 of the above-described embodiment; rather, the ends are oriented in a direction along the surface of the stacked members. The shielding members 320 are formed from a ferromagnetic material.

By locating the end 321 in the sites 151 to be heated, magnetic flux M is induced at the sites 151 to be heated and easily converges. As a result, the magnetic flux density is increased at the sites 151 to be heated, and it is possible to efficiently carry out selective induction heating of the sites 151 to be heated.

The shielding members are not limited to the shielding members 120, 320 that are formed from a ferromagnetic material, and include a shielding member that are formed from a non-magnetic metal body.

Figure 8:
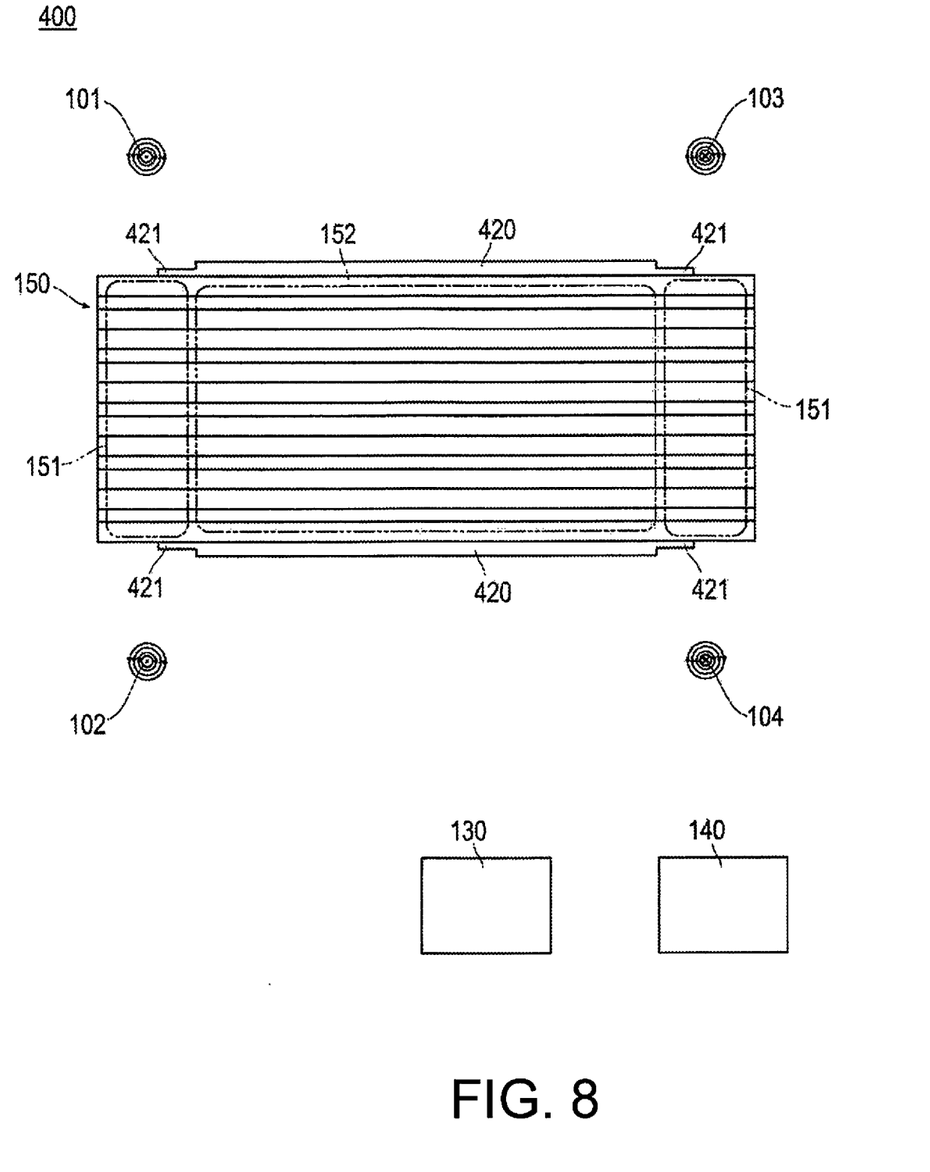
FIG. 8 is a schematic view schematically illustrating an overview of the fuel cell manufacturing device of a third modified example.

The shielding members 420 illustrated in FIG. 8 are formed from a non-magnetic metal body, and has different thicknesses. The thicknesses of the shielding members 420 are relatively thick at the heating-unnecessary site 152, and the thicknesses are relatively thin at ends 421 are is disposed in the sites 151 to be heated. Examples of a non-magnetic metal body that form each of the shielding members 420 include aluminum, copper, and austenitic SUS. The configurations of the fuel cell manufacturing device 400 other than the shielding members 420 are the same as the fuel cell manufacturing device 300.

The shielding members 120 and the shielding members 320, which are formed from a ferromagnetic material (refer to FIG. 5 and FIG. 7), conduct shielding by inducing the magnetic flux M so as to avoid the heating-unnecessary site 152. On the other hand, when high-frequency magnetic flux from the coils 101, 102, 103, 104 acts, magnetic flux that cancels out this high-frequency magnetic flux is generated in the shielding members 420 that are formed from a non-magnetic metal body, and the high-frequency magnetic flux is thereby shielded.

When a high-frequency magnetic flux acts on the shielding members 420, the induction current that generates the magnetic flux that cancels out the high-frequency magnetic flux will vary according to the electrical resistance. Since the shielding members 420 has different thicknesses and the electrical resistance differs depending on the site, the shielding effect also differs depending on the site.

The electrical resistance is low in a thick location disposed in the heating-unnecessary site 152. Accordingly, when a high-frequency magnetic flux acts, the magnetic flux that cancels out the high-frequency magnetic flux is increased. Therefore, the shielding effect is high.

On the other hand, the electrical resistance is high in the thin locations 421 disposed in the sites 151 to be heated. Accordingly, when high-frequency magnetic flux acts, the magnetic flux that cancels out the high-frequency magnetic flux is small. Therefore, the shielding effect is low.

In this manner, the shielding members 420 are formed from a non-magnetic metal body and has differing thicknesses, and the shielding effect against magnetic flux is thereby adjusted. Accordingly, the shielding members 420 are capable of controlling the distribution of the generated heat of the fuel-cell module 150 according to the magnitude of the thickness.

In addition, for example, a temperature sensor such as a thermocouple may be provided to the shielding members 120, 320, 420. If the control device 140 controls the electric current of the coils 101, 102, 103, 104 based on the temperature that is detected by the temperature sensor, it is possible to more appropriately adjust the heating temperature.

Additionally, in the embodiment described above, the number of the magnetic path forming members 110 differs as a function of the disposed location, as illustrated in FIG. 3, and the saturation magnetic flux density is thereby varied; however, the method to vary the saturation magnetic flux density according to location is not limited in this way.

The saturation magnetic flux density may be varied by changing the material or the volume material, or changing at least two from among the disposed number, the material, and the volume, of the magnetic path forming members 110, depending on the disposed location of the magnetic path forming members 110. Furthermore, the saturation magnetic flux density may be varied by changing the ratio (W/G) of the gap G between the magnetic path forming members 110 in the stacking direction illustrated in FIG. 1 and the opening W depending on the disposed location of the magnetic path forming members 110.

Figure 9:
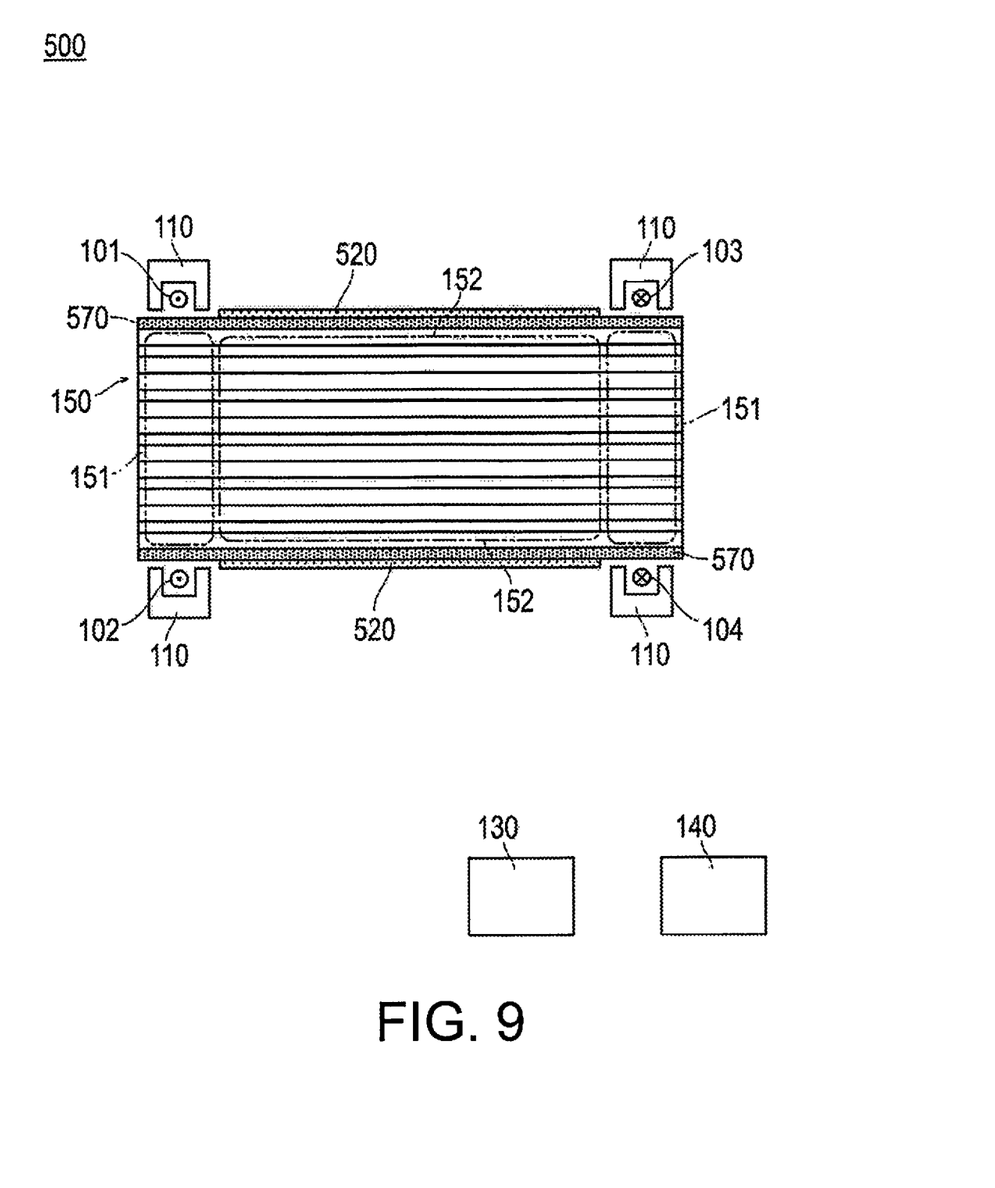
FIG. 9 is a schematic view schematically illustrating an overview of the fuel cell manufacturing device of a fourth modified example.

Additionally, the present invention includes a fuel cell manufacturing device 500 in which non-magnetic metal plates 570 are disposed between shielding members 520 and the fuel-cell module 150 (laminate), as illustrated in FIG. 9. The fuel cell manufacturing device 500 comprises the coils 101, 102, 103, 104, the magnetic path forming members 110, the power source 130 and the control device 140. The coils 101-104, the magnetic path forming members 110, the power source 130, the control device 140, and the fuel-cell module 150 are substantially the same as in the above-described embodiment, so that the same reference numerals are provided in the drawings, and the associated explanations are omitted here.

The shielding members 520 are disposed in the heating-unnecessary sites 152 with the metal plates 570 interposed therebetween, and shields the magnetic flux from the coils 101-104. The material that forms the shielding members 520 is the same as the shielding members 120 of the above-described embodiment. The shielding members 520 have a smooth plate shape with a substantially constant thickness. The shielding members 520 pressurize the fuel-cell module 150 in the stacking direction.

The shielding members 520 have substantially the same width as the heating-unnecessary site 152 in the planar direction. The ends of the shielding members 520 is are positioned further on the heating-unnecessary site 152 side than the sites 151 to be heated in the planar direction, and are not between the sites 151 to be heated and the magnetic path forming members 110.

The metal plates 570 are disposed between the shielding member 520 and the heating-unnecessary site 152, are extended in the planar direction, and disposed at the sites 151 to be heated. Examples of materials that form the metal plates 570 include aluminum, copper, and austenitic SUS.

In the heating-unnecessary site 152, heat generation is suppressed more compared to the sites 151 to be heated; however, when there is variation in the heat generating conditions in the stacking direction and the planar direction, it is conceivable that a portion of the heating-unnecessary site 152 becomes locally higher in temperature than the other portions.

In contrast, in the present modified example, the metal plates 570 extend between the shielding members 520 and the heating-unnecessary site 152, and the heat generating conditions in the stacking direction and the planar direction are thereby made uniform in the heating-unnecessary site 152; therefore, it is possible to suppress the overall heat generation in the heating-unnecessary site 152 in a substantially uniform manner.

The sites 151 to be heated generates heat at a relatively higher temperature than the heating-unnecessary site 152; however, when there is variation in the heat generating conditions in the stacking direction and the planar direction, it is conceivable that heat generation is suppressed in a portion of the sites 151 to be heated, or that a portion of the sites 151 to be heated will generate heat greater than or equal to a predetermined temperature.

In contrast, in the present modified example, a metal plate 570 that extends in the planar direction is disposed in the sites 151 to be heated, and the heat generation conditions in the stacking direction and the planar direction are thereby made uniform in the sites 151 to be heated; therefore, it is possible to generate heat in the sites 151 to be heated over the entirety thereof in a substantially uniform manner.

Figure 10:
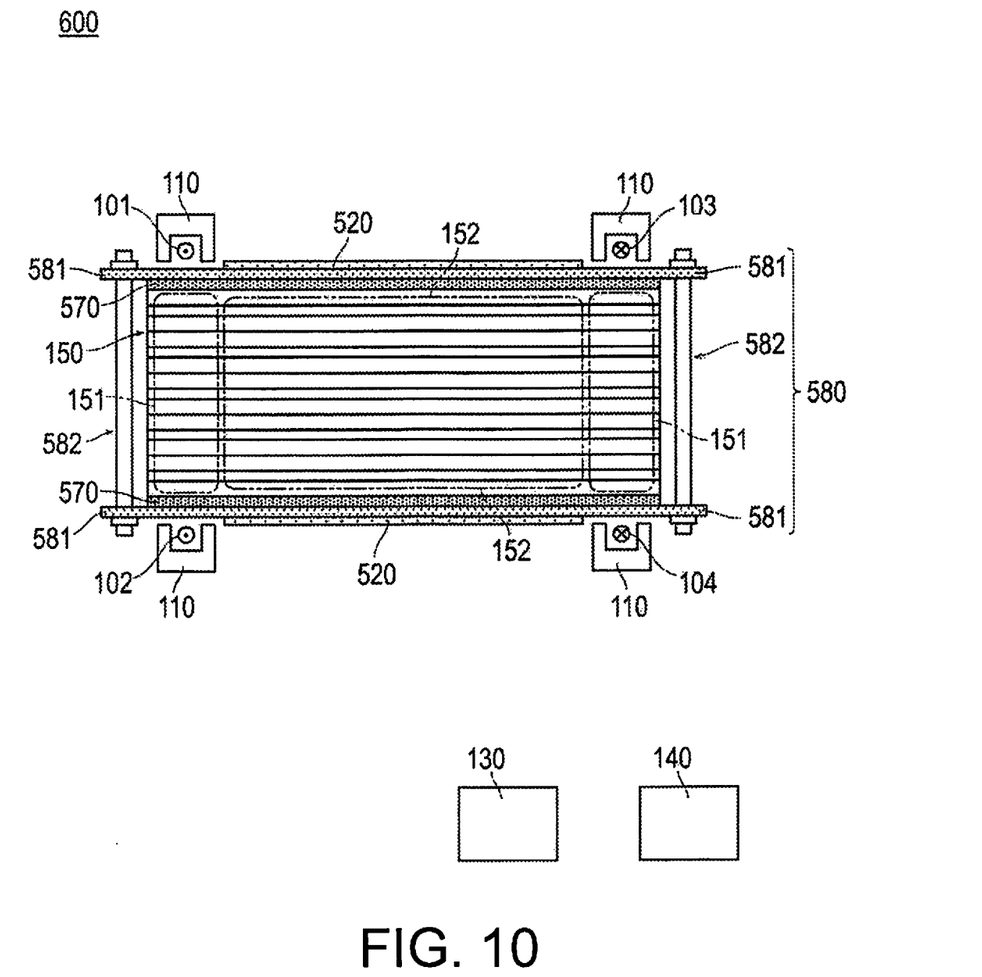
FIG. 10 is a schematic view schematically illustrating an overview of the fuel cell manufacturing device of a fifth modified example.

The present invention includes a fuel cell manufacturing device 600 that pressurizes the fuel-cell module (laminate) with a pressing fixture 580 provided with a pair of non-conductive member 581 and a pair of fastening members 582, as is illustrated in FIG. 10.

The fuel cell manufacturing device 600 is different from the aforementioned fuel cell manufacturing device 500 in that the pressing fixture 580 is included but is otherwise the same as the fuel cell manufacturing device 500 in other configurations; therefore, the same reference numerals are provided in the drawings, and redundant explanations are omitted.

The non-conductive members 581 has a smooth plate shape with a substantially constant thickness. The non-conductive members 581 are formed from, for example, resin.

The non-conductive members 581 are disposed on both sides of the fuel-cell module 150 in the stacking direction and sandwiches same. The non-conductive members 581 are disposed between the shielding members 520 and the metal plates 570. The non-conductive members 581 are disposed in the site to be heated 512, is extended in the planar direction, and disposed in the sites 151 to be heated. In addition, the non-conductive members 581 protrude from the edge of the fuel-cell module 150 in the planar direction.

The fastening members 582 each comprises a shaft-like member, on the outer perimeter of which is formed a screw groove, and a nut that is screwed to this shaft-like member. The fastening members 582 fasten the non-conductive members 581 to each other, by inserting the shaft-like member on which is formed a screw groove into the non-conductive member 581 and fastening same with a nut.

The present modified example is configured to pressurize the fuel-cell module 150 with the non-conductive members 581; it is thereby possible to pressurize the sites 151 to be heated through which magnetic flux passes, and to cure the adhesive in a state in which members are placed more closely in contact with each other, and therefore it is possible to more firmly bond the members together.

Figure 11:
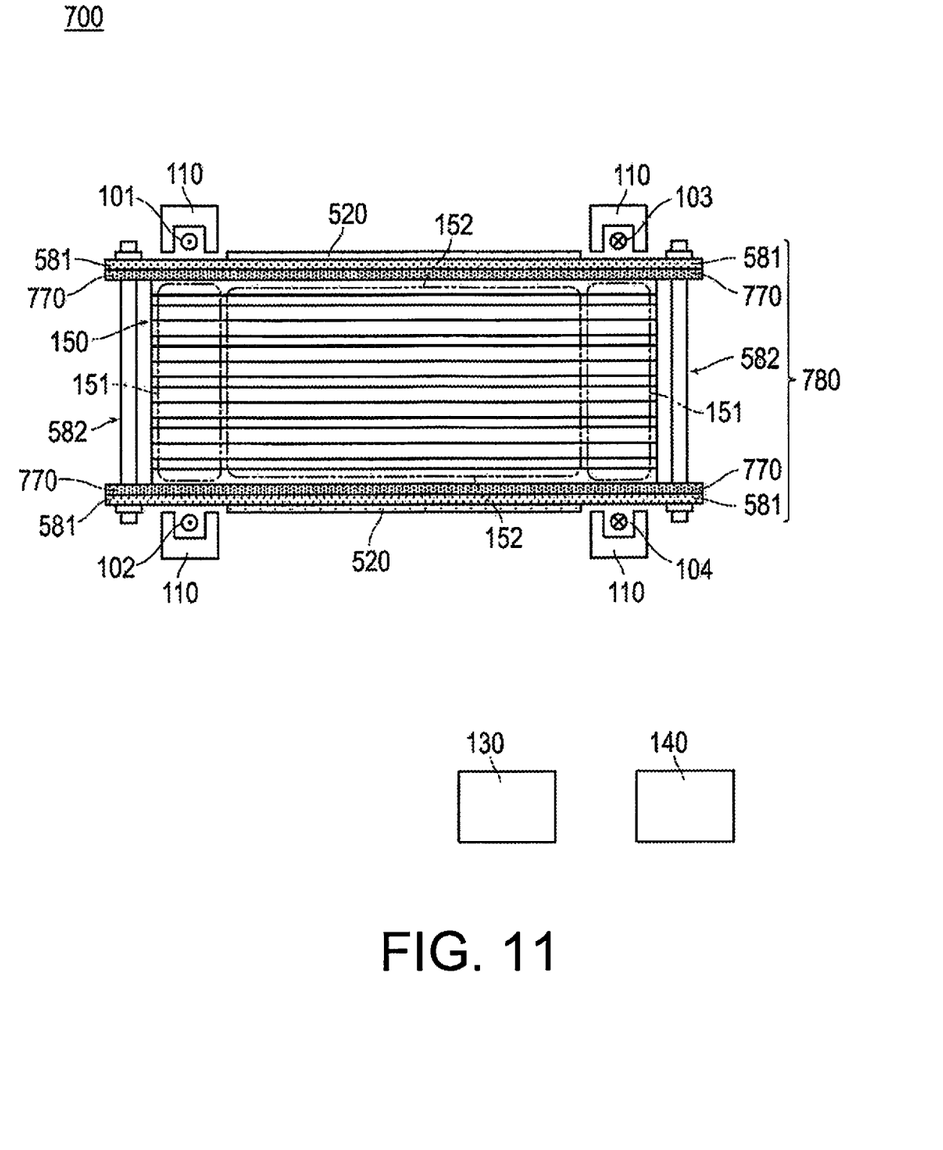
FIG. 11 is a schematic view schematically illustrating an overview of the fuel cell manufacturing device of a sixth modified example.

In addition, the present invention includes a fuel cell manufacturing device 700 in which the non-conductive members 581 and the metal plates 770 are integrally formed, as is illustrated in FIG. 11.

The fuel cell manufacturing device 700 is different from the aforementioned fuel cell manufacturing device 600 in that the non-conductive members 581 and the metal plates 770 are integrally formed, but is otherwise the same as the fuel cell manufacturing device 600 in other configurations; therefore, the same reference numerals are provided in the drawings, and redundant explanations are omitted.

Unlike the metal plates 570 in FIG. 10, the metal plates 770 protrude from the edge of the fuel-cell module 150 in the planar direction, but other configurations thereof, such as the material that forms the metal plates 770, are the same as the metal plates 570.

The pressing fixtures 780 of the present modified example include the metal plates 770, and pressurizes the fuel-cell module 150 by fastening the integrally formed metal plates 770 and the non-conductive members 581 with the fastening members 582.

In the present modified example, the metal plates 770 and the non-conductive members 581 are integrally formed and used for pressurizing the fuel-cell module 150, and the non-conductive members 581 are reinforced by the metal plates 770; therefore, it is possible to improve the durability of the non-conductive members 581.

In addition, since a deformation of the non-conductive members 581 is suppressed by the metal plate 770 and the non-conductive members 581 being integrally formed and used, it is possible to precisely and reliably pressurize the fuel-cell module 150.

The invention claimed is:

1. A fuel cell manufacturing method comprising:
heating a site of a laminate, the laminate obtained by stacking a membrane electrode assembly and a separator with an adhesive disposed between the membrane electrode assembly and the separator, by disposing coils on opposite sides of the site in a stacking direction of the membrane electrode assembly and the separator and generating an induction current by passing an electric current through the coils such that the electric current flows in a direction intersecting the stacking direction, the direction intersecting the stacking direction not being parallel to a portion of the membrane electrode assembly that includes an electrode or an electrolyte membrane.

2. The fuel cell manufacturing method according to claim 1, further comprising
disposing a shielding member that shields magnetic flux from the coils in a site of the laminate that does not require heating.

3. The fuel cell manufacturing method according to claim 2, wherein
the shielding member formed from a ferromagnetic material is disposed such that an end of the shielding member is positioned in the site to be heated.

4. The fuel cell manufacturing method according to claim 3, wherein
the end of the shielding member is disposed so as to be oriented in the stacking direction.

5. The fuel cell manufacturing method according to claim 2, wherein
the shielding member is formed from a non-magnetic metal body and that has differing thicknesses.

6. The fuel cell manufacturing method according to claim 1, further comprising
disposing a magnetic path forming member that surrounds the coils and that forms a magnetic path by an opening being provided thereto such that the opening faces the site to be heated.

7. The fuel cell manufacturing method according to claim 6, further comprising
varying a saturation magnetic flux density of the magnetic path forming member depending on a disposed location of the magnetic path forming member.

8. The fuel cell manufacturing method according to claim 7, wherein
the saturation magnetic flux density is varied by changing a material of the magnetic path forming member.

9. The fuel cell manufacturing method according to claim 7, wherein
   the saturation magnetic flux density is varied by changing a number of the magnetic path forming members.

10. The fuel cell manufacturing method according to claim 7, wherein
    the saturation magnetic flux density is varied by changing a volume of the magnetic path forming member.

11. The fuel cell manufacturing method according to claim 7, wherein
    the saturation magnetic flux density is varied by changing a ratio of a gap between the magnetic path forming members disposed on both sides in the stacking direction and the width of the opening.

12. The fuel cell manufacturing method according to claim 1, wherein
    the site to be heated is heated in a state in which the laminate is pressurized.

13. The fuel cell manufacturing method according to claim 12, further comprising
    disposing a pressing fixture that pressurizes the laminate in a site of the laminate that does not require heating to shield magnetic flux from the coils by the pressing fixture.

14. The fuel cell manufacturing method according to claim 13, further comprising
    providing a temperature sensor to the pressing fixture, and controlling electric current that passes through the coils based on a temperature that is detected by the temperature sensor.

* * * * *